(12) United States Patent
Wong et al.

(10) Patent No.: US 6,217,175 B1
(45) Date of Patent: Apr. 17, 2001

(54) LASER MARKING PROCESS ON RETRO-REFLECTIVE MATERIAL FOR SECURITY LABELS

(75) Inventors: William Wong, Fremont, CA (US); Michael L. Rutigliano, Chandler, AZ (US); David A. Brown, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/105,480

(22) Filed: Jun. 26, 1998

(51) Int. Cl.[7] ................................................. G02B 5/126
(52) U.S. Cl. .......................... 359/534; 359/536; 359/900; 283/74
(58) Field of Search ..................................... 359/534–542, 359/900; 283/70, 74; 428/199; 40/625

(56) References Cited

U.S. PATENT DOCUMENTS 5,073,404 * 12/1991 Huang ..................................... 427/39

* cited by examiner

Primary Examiner—James Phan
(74) Attorney, Agent, or Firm—Blakely, Sokoloff, Taylor & Zafman LLP

(57) ABSTRACT

A simplified method and apparatus for creating counterfeit-resistant labels is described. A laser is used to mark a retro-reflective material such that light only from specific directions are reflected back towards the source. During authentication of the labels, the label is tilted to verify that only light from the specific directions are reflected back towards the source.

13 Claims, 2 Drawing Sheets

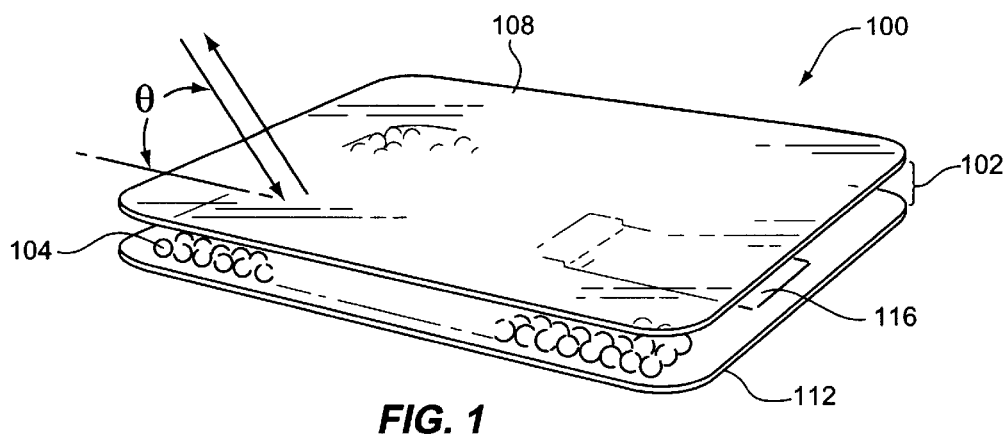
FIG. 1
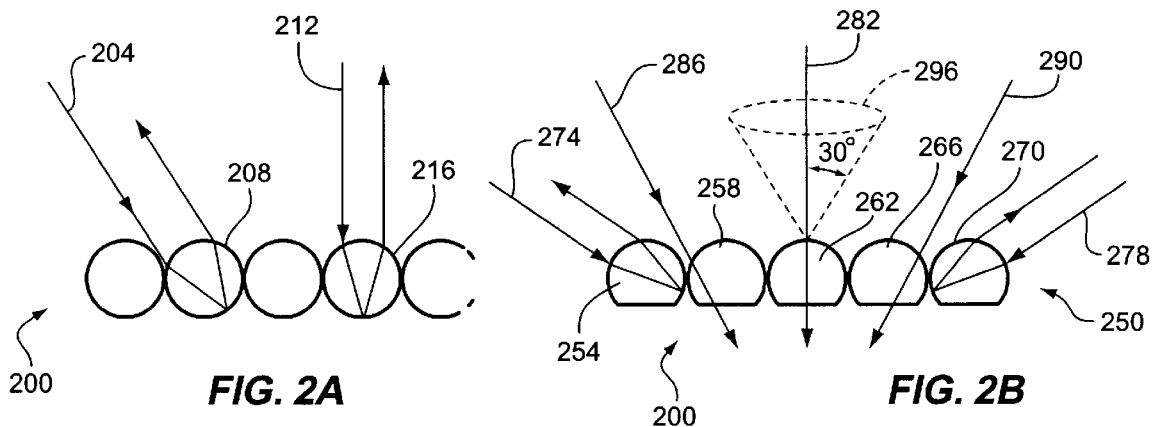
FIG. 2A  FIG. 2B
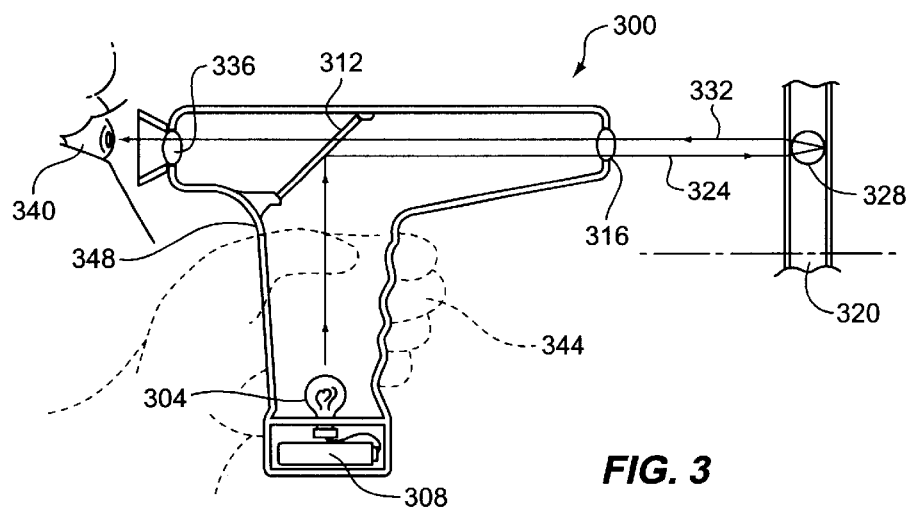
FIG. 3

LASER MARKING PROCESS ON RETRO-REFLECTIVE MATERIAL FOR SECURITY LABELS

BACKGROUND OF THE INVENTION

1. Field of the Invention

The present invention relates to a method and apparatus for identifying authentic goods. More specifically, the present invention relates to laser marking retro-reflective material.

2. Description of related art

Each year, counterfeiting of authentic goods costs consumers and companies millions of dollars. Such counterfeiting may take many different forms. In one form of counterfeiting, the counterfeiters completely replicate the product, including identification labels on the product. In the electronics industry, identification labels convey significant information about a product. Visually determining the performance characteristics of an electronic product may be difficult. For example, the labels may convey significant information such as adherence to military specifications or other stringent criteria which materially affects the price of the electronics. In order to obtain a favorable price, counterfeiters may grind off the authentic marks or labels and re-etch counterfeit marks in place of the authentic marks to indicate that the product meets more stringent specifications. When a counterfeit mark cannot be etched, counterfeiters may completely remove the authentic label and substitute a blank clone surface which has been marked with a laser to generate a counterfeit label mark.

To prevent duplication of labeled surfaces, proprietary materials and techniques have been used to mark labeled surfaces with a proprietary "tag." The tag is typically difficult to duplicate by standard counterfeiting mechanisms. However, detecting the tag is often difficult and requires the use of proprietary equipment that is often not easily available to legitimate customers of the product.

Thus, a label is needed which is difficult for counterfeiters to duplicate, but easy for a legitimate customer to detect using commonly available detecting equipment.

SUMMARY OF THE INVENTION

The present invention relates to an identification apparatus in which a retro-reflective surface is marked with a laser to create marking on the retro-reflective-surface.

BRIEF DESCRIPTION OF THE DRAWINGS

FIG. 1 illustrates one embodiment of a retro-reflective label for use in the current invention.

FIG. 2A illustrates the retro-reflective surface of FIG. 1 prior to laser marking.

FIG. 2B illustrates the retro-reflective surface of FIG. 1 after laser marking.

FIG. 3 illustrates one embodiment of a device used to determine whether a retro-reflective surface has been marked with a laser.

DETAILED DESCRIPTION

Figure 4:
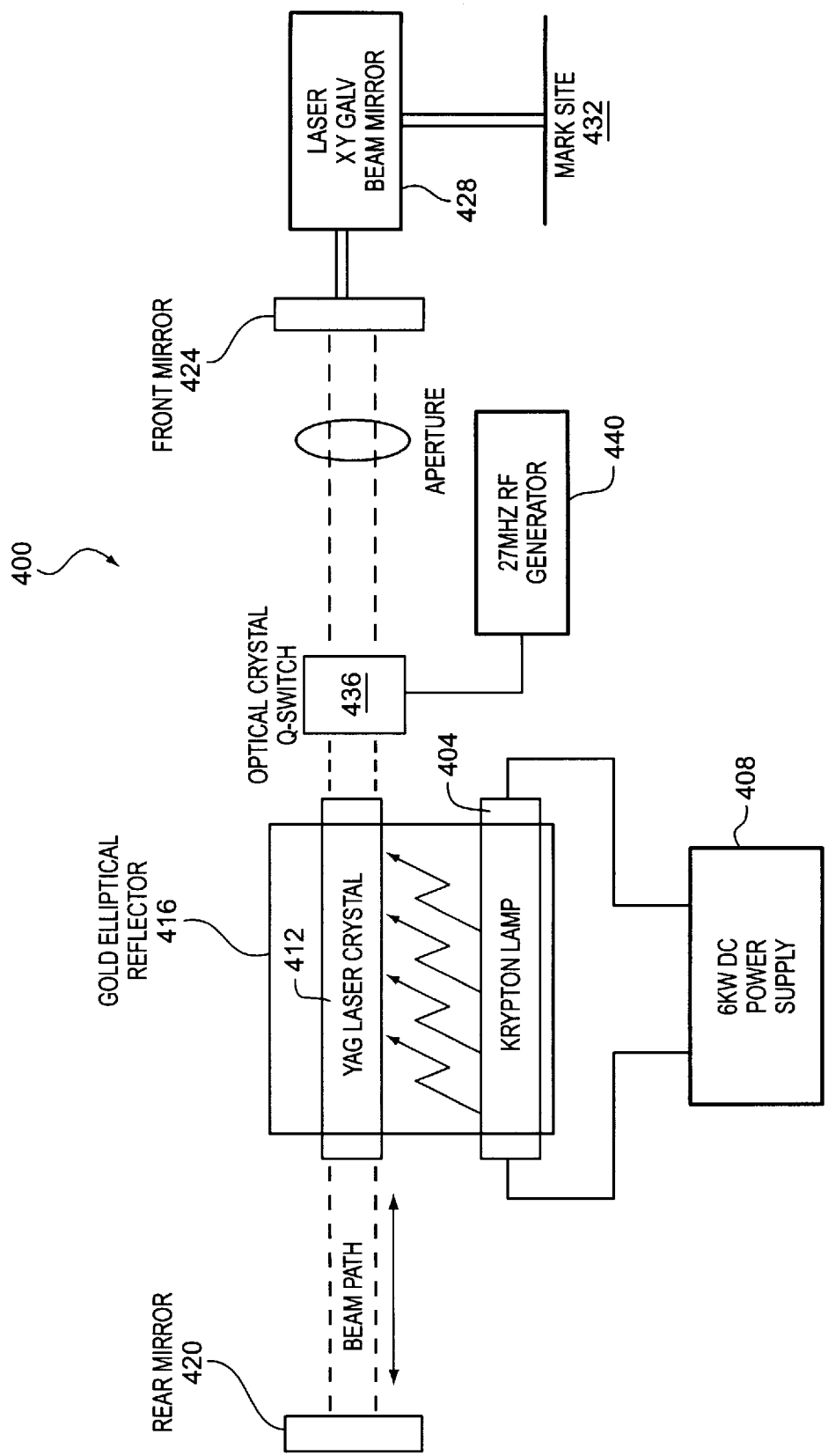
FIG. 4 illustrates one embodiment of a laser used to mark a pattern into a retro-reflective surface.

In the following detailed description, a method and apparatus for creating labels that are difficult to counterfeit and which can be easily verified using inexpensive equipment will be described. In the description, a number of details such as the type of retro-reflective material used, the brand name of the labels and the types of laser used to mark the labels will be included. These details are included to facilitate understanding of the invention and should not be interpreted to limit the scope of the invention.

FIG. 1 illustrates one embodiment of a label 100 for use in the present invention. Label 100 includes a retro-reflective layer 102 having a retro-reflective surface 104. A "retro-reflective surface" is a surface which bounces incident light back towards the source of the light. Thus, light incident at an arbitrary angle ($\Theta$) will exit retro-reflective surface 104 in approximately the same direction and at the same angle that it arrived. Retro-reflective surface 104 may be formed using a variety of media including, but not limited to spherical reflective beads, and right-angular structures. The spherical beads may be composed of a variety of materials including plastics, glass, and other generally transparent material.

In one embodiment of the invention, a protective transparent upper layer 108 and a supportive backing 112 sandwiches retro-reflective layer 102 including retro-reflective surface 104. Protective layer 108 prevents scratching of retro-reflective surface 104. Supportive backing 112 provides structural support as well as adhesives to affix label 100 to a surface. In one embodiment of the invention, label 100 may incorporate a watermark 116. The watermark 116 may also be formed to spell out a trademark, for example "3M Corporation", on backing material 112. The watermark 116 may also be incorporated into retro-reflective layer 102 or protective layer 108. An example of a commercially available retro-reflective identification label 100 suitable for use with the present invention is produced by the Minnesota Mining and Manufacturing Company (3M™ Company) of Saint Paul, Minn. under the brand name Confirm Security Labels.

Portions of the retro-reflective layer 104 may be unmarked while other portions are marked. FIG. 2A illustrates one embodiment of an unmarked retro-reflective layer 200 while FIG. 2B illustrates one embodiment of the marked retro-reflective layer 250. In the unmarked retro-reflective layer 200 shown in FIG. 2A, incident light such as light ray 204 enters an unmarked bead 208 where the light ray 204 undergoes refraction, reflection and a second refraction as the light ray 204 exits the unmarked bead 208. After two refractions and a reflection, light ray 204 exits the unmarked bead 208 in the same direction in which the light beam 204 was originally incident. An "on axis" light ray 212 is illustrated as being incident on an undamaged bead 216 at an angle normal ("on axis") to the surface of the retro-reflective layer 200. The "on axis" light ray 212 exits the unmarked bead 216 at an angle normal to the surface of the unmarked retro-reflective layer 200 thereby directing light back to the light source.

FIG. 2B illustrates the effect on light rays of a retro-reflective layer 250 which has been marked. In marked beads 254, 258, 262, 266, 270, one portion of the beads is "damaged". In one embodiment of the invention, the bottom surface of the marked beads 254, 258, 262, 266, 270, are marked such that incident off axis light rays such as light rays 274, 278 are substantially reflected towards the source. Off axis light rays 274, 278 undergo a reflection within the marked bead 254, 270. However, incident light which is normal or "on axis," such as light ray 282, and light rays 286, 290 that are only slightly off axis do not undergo the reflections which occur from bouncing off internal surfaces of marked beads 258, 262, 266. In one embodiment of the invention, "slightly off axis" light rays are light rays which are incident within approximately 30° from an on axis ray 282 of light. Thus, light rays entering within a cone 296 around on axis ray 282 are either scattered or substantially absorbed by supporting backing 112 of FIG. 1.

When placing a sensor and an off axis light source, marked beads 254, 258, 262, 266, 270 will reflect to the detector a significant amount of the incident light, resulting in a bright image, which merges with the incident light reflected from unmarked beads. However, as the label 100 is tilted such that the label 100 of FIG. 1 is substantially normal to the light source and the light detector, incident light is either absorbed or scattered by the marked or "damaged" surface of the marked beads, resulting in a dark image. Thus, when the incident light source and the detector are approximately normal to the label 100, the marked beads will appear darker than the unmarked beads.

FIG. 3 illustrates an apparatus used to assist a viewer in verifying the markings on a marked label. The illustrated apparatus simplifies viewing, but is not necessary. In order to view the mark, a flashlight is sufficient. By aligning the flashlight, a detector such as a viewer's eye and a retro-reflective surface to form an approximate line, the user can observe whether the retro-reflective surface is reflecting normally incident light incident from the flashlight. One method of aligning a flashlight and the detector is to place the flashlight on the forehead between the eyes. However, such positioning is awkward and a simple viewing apparatus such as viewing device 300 illustrated in FIG. 3 simplifies alignment of the light source, detector and retro-reflective surface.

One embodiment of viewing device 300 includes a hand-held device which includes an incoherent light source such as a light bulb 304 and a power supply such as a battery 308. The light ray travels to a beam splitter 312 which reflects the light ray to an output aperture 316 where it exits viewing device 300. The light ray continues to retro-reflective surface 320 where the light ray 324 is incident on a retro-reflective bead 328. In one embodiment, retro-reflective surface 320 is the retro-reflective surface 104 of a label 100 as illustrated in FIG. 1. When the retro-reflective bead is not marked, the incident light ray 324 is reflected and, the reflected light ray 332 returns through output aperture 316 and re-enters viewing device 300. A percentage of the reflected light ray 332 passes through beam splitter 312 and exits a second aperture 336 where it exits viewing device 300. A detector, such as a user's eye 340 positioned near the second aperture 336 detects the light reflected from the retro-reflective surface 320. When the retro-reflective surface 320 reflects incident light rays 324, the eye 340 detects a bright color such as white. When marked beads in the retro-reflective surface 320 do not reflect on axis incident light, the non-reflective areas created by the marked beads appear darker to the eye 340.

The marked beads typically form a pattern to write out a word such as "PENTIUM II". In one embodiment of the invention, the viewing device 300 is sized to be hand-held device. In the illustrated embodiment, a hand 344 grips a handle 348 of the viewing device 300. Beam splitter 312 simplifies alignment of the light source 304, eye 340 and retro-reflective surface 320. By redirecting light, beam splitter 312 acts as a light source which is properly aligned with the eye, and the retro-reflective surface 320.

Various methods exist to mark a retro-reflective surface such that only off axis light is reflected towards the source. One method of marking uses a laser to mark beads in the retro-reflective surface. A laser focuses on an unmarked beads such as the unmarked beads illustrated in FIG. 2A to "damage" or mark one portion of the bead creating the marked beads of FIG. 2B. In one embodiment of the invention, the laser is positioned such that the incident marking laser beam arrives on axis or perpendicular to a plane containing the unmarked beads. As illustrated in FIG. 2B, the marked beads reflect off axis incident light but absorb or scatter on axis incident light. Typical lasers include, but are not limited to, CO2 (carbon dioxide) laser and NdYAG (Neodymium Yttrium Aluminum Garnet) lasers.

FIG. 4 illustrates a typical NdYAG laser which may be used to mark the retro-reflective layer. The marking assembly 400 includes a power supply 408 which powers a pumping mechanism such as a krypton lamp 404. The energy from krypton lamp 404 excites quantum states in a NdYAG laser crystal 412. A reflector such as a gold elliptical reflector 416 reflects spontaneous emission photons back into the NdYAG laser crystal 412 to help maintain the quantum state inversion needed for lasing.

Two mirrors at either end of the cavity including a rear mirror 420, which is one embodiment is 99.9% reflective and a transmissive front mirror 424 which in one embodiment is only 12% transmissive form a laser cavity. The light output of the laser exits the front mirror 424. A galvanometer or mirror assembly 428 controls movement of the output laser beam. The mirror assembly 428 directs the laser beam to the retro-reflective surface 432. By moving mirrors in the mirror assembly 428, the pattern drawn by the laser beam can be controlled and directed.

Although a continuous laser output can be directed to write a pattern on the retro-reflective surface 432, control of laser output power is more difficult when using a continuous laser output. Excessive laser output damages the labels, including the retro-reflective material. Thus, in one embodiment of the invention, a Q-switch 436 which allows light to pass in brief bursts is used. Mirror assembly 428 moves the beam a short distance between bursts of laser light. The resulting pattern created by Q-switching bursts is a pattern composed of marked beads or pixels. In one embodiment of the invention, adjacent pixels overlap to form lines. Typical overlaps ranges from 20–25% of the overall pixel size.

Although a variety of Q-switches speeds may be used, in the illustrated embodiment, a 27 megahertz RF generator 440 is used to control the Q-switch 436. Thus, the Q-switch pulses the laser at a frequency of 27,000 cycles per second. Marking speed is a rate at which the galvanometers or mirror assembly 428 move the laser beam across the retro-reflective surface. At a Q-switch or pulse rate of approximately 27,000 pulses per second, an appropriate mark speed would be 20 inches per second when using a laser output of 1.7 watts. The pulse rate is a function of the power used and the marking speed. For example, increasing the power of the laser output typically increases the marking speed.

The laser markings are preferably made on a label which includes watermarks. The combination of laser markings and the accompanying watermarks are difficult to duplicate. Using a simple viewing device such as the viewing device 300 illustrated in FIG. 3, legitimate purchasers of the product can verify the labels.

While certain exemplary embodiments have been described and shown in the accompanying drawings and description is to be understood that such embodiments are merely illustrative of and not restricted from the broad invention, and that this invention not be limited to the specific constructions and arrangements shown and described, since various other modifications may occur to those ordinarily skilled in the art.

What is claimed is:

1. An identification apparatus comprising:
    a retro-reflective surface formed from a layer of spherical beads; and
    markings on the retro-reflective surface created by a laser, wherein the laser damages a portion of each bead marked by the laser such that each bead marked by the laser scatters incident light received from a source of light when the source of light is positioned normal to said retro-reflective surface.

2. The identification apparatus of claim 1 wherein each bead marked by the laser reflects light from an off axis source back towards the off axis source.

3. A method of fabricating identification labels comprising:
    moving a retro-reflective surface under a laser; and
    adjusting a laser beam to mark a pattern into the retro-reflective surface.

4. The method of claim 3 wherein said adjusting of the laser is accomplished using a galvanometer.

5. The method of claim 3 wherein the laser beam is pulsed to prevent damage to the retro-reflective surface.

6. The method of claim 3 wherein the laser is a NdYAG laser.

7. The method of claim 3 wherein the laser is a carbon dioxide laser.

8. The method of claim 3 further comprising the acts of:
    verifying the validity of the pattern by aligning a light source to illuminate the pattern and placing a detector in proximity with the light source such that the detector, the light source and the mark form an approximate line.

9. The method of claim 8 wherein the detector is a human eye.

10. An apparatus to identify a product comprising;
    means for focusing and reflecting incident light towards a source of the incident light; and
    means for marking the means for focusing and reflecting incident light to create a marked surface reflecting off axis incident light towards the source and for scattering incident light arriving approximately normal to the surface.

11. The apparatus of claim 10 wherein the means for marking is a laser.

12. The apparatus of claim 10 wherein the means for focusing and reflecting incident light is a retro-reflective surface.

13. The apparatus of claim 12 wherein the retro-reflective surface includes a layer of reflective beads.

* * * * *